United States Patent [19]

Atkins

[11] 4,106,006

[45] Aug. 8, 1978

[54] DUAL-FREQUENCY INDUCTION-KEYED CONTROL CIRCUIT WITH KEYING NETWORK HAVING VARIABLE RESONANT FREQUENCY

[75] Inventor: Carl E. Atkins, Montclair, N.J.

[73] Assignee: Wagner Electric Corporation, Parsippany, N.J.

[21] Appl. No.: 652,465

[22] Filed: Jan. 26, 1976

[51] Int. Cl.[2] .............................................. H04Q 3/00

[52] U.S. Cl. ................................ 340/543; 340/152 T; 340/552; 340/171 PF; 340/149 R; 343/6.5 SS

[58] Field of Search ................... 340/280, 258 C, 224, 340/152 T; 343/6.5 SS; 325/473, 474; 317/134; 361/172, 179

[56] References Cited

U.S. PATENT DOCUMENTS

| | | | |
|---|---|---|---|
| 2,541,461 | 2/1951 | Churchill | 340/274 C |
| 3,088,106 | 4/1963 | Kingsford-Smith | 343/6.5 SS |
| 3,125,753 | 3/1964 | Jones | 343/6.5 SS |
| 3,172,102 | 3/1965 | Chapman | 343/6.5 SS |
| 3,732,465 | 5/1973 | Palmer | 317/134 |
| 3,798,642 | 3/1974 | Augenblick | 343/6.5 SS |
| 3,842,324 | 10/1974 | Atkins | 361/179 X |

*Primary Examiner*—Harold I. Pitts

*Attorney, Agent, or Firm*—Eyre, Mann, Lucas & Just

[57] ABSTRACT

A dual-frequency keyable control circuit is triggered into providing an electrical control output signal when two passive keying circuits, tuned to the correct radio frequencies are brought close enough to a sensing element of the keyable control circuit to cause mutual influence between the passive keying circuits and the sensing element. When the keyable control circuit detects that modulation is present at both ratio frequencies in sequence, it produces control signals which can unlock a door, actuate or defeat an alarm, or perform other functions for which it is desired to require key combinations to attain access.

8 Claims, 5 Drawing Figures

DUAL-FREQUENCY INDUCTION-KEYED CONTROL CIRCUIT WITH KEYING NETWORK HAVING VARIABLE RESONANT FREQUENCY

BACKGROUND OF THE INVENTION

The present invention relates to control circuitry actuable by a plurality of inductively coupled, variably tuned keying circuits. In the circuits disclosed in U.S. Pat. Nos. 3,624,415 and 3,628,099, both in the names of Carl E. Arkins and Arthur F. Cake, keying circuits requiring that the correct value of resistance in an external keying circuit be connected are used to actuate a keyable control circuit. In U.S. Pat. No. 3,723,967 in the names of Carl E. Atkins and Paul A. Carlson, a single inductively coupled tuned keying circuit absorbs energy from the radio frequency tank circuit of a free-running oscillator operating at the frequency to which the keying circuit is tuned.

Radio frequency detection circuits detect the reduction in energy remaining in the oscillator and thereupon produce a control signal. The absorption method of keying exhibits the disadvantage that a piece of magnetic ferrous metal could also absorb sufficient energy to cause keying.

In U.S. Pat. No. 3,842,324 a single external keying circuit includes a diode having a sharply variable junction capacitance when subjected to varying conditions of bias. When the keying circuit is exposed to radio frequency energy of the correct frequency, the net capacitance in the keying circuit due to variations in that the diode junction capacitance oscillates at an audio frequency rate, and consequently, varies the amount of absorption of radio frequency energy from the keyable control circuit at the same audio frequency rate. The keyable control circuit connects an enable signal to the load only upon detecting this modulation. Consequently, the diode-modulation method in this invention avoids triggering from mere absorption alone.

The prior art suffered from the fact that only a limited number of discrete radio frequencies could be used with practical circuits. Consequently, the number of different "keys" which could be produced with single-channel devices was limited.

SUMMARY OF THE INVENTION

The present invention utilizes a plurality of radio frequencies which are matched with corresponding tuned circuits in external keying circuits. By requiring the presence of more than one properly tuned external keying circuit, either simultaneously or in sequence, a larger number of "keys" is possible. The number of "keys" which it is possible to use is:

$$C = \binom{n}{k} = \frac{n!}{k!\,(n-k)!}$$

Where:

$C$ = number of keys $n$ = number of discrete useable frequencies $k$ = number of keying frequencies used.

For example:

if $n = 50$ $k = 2$ $$C = \frac{50 \times 49 \times (48!)}{(2 \times 1) \times (48!)} = 1225$$

It is an object of this invention to provide an inductively keyed control system in which a large number of keying combinations are possible.

It is a further object of this invention to provide an inductively keyed system utilizing a plurality of radio frequencies and a corresponding plurality of external tuned keying circuits.

It is a further object of this invention to provide a plurality of passive external keying circuits which will impose amplitude modulation on the radio frequencies being generated in a radio frequency oscillator.

It is a further object of this invention to provide a multi-channel inductively coupled keying system which is insensitive to triggering by untuned external absorption of radio frequency energy.

DESCRIPTION OF THE PREFERRED EMBODIMENT

Figure 1:
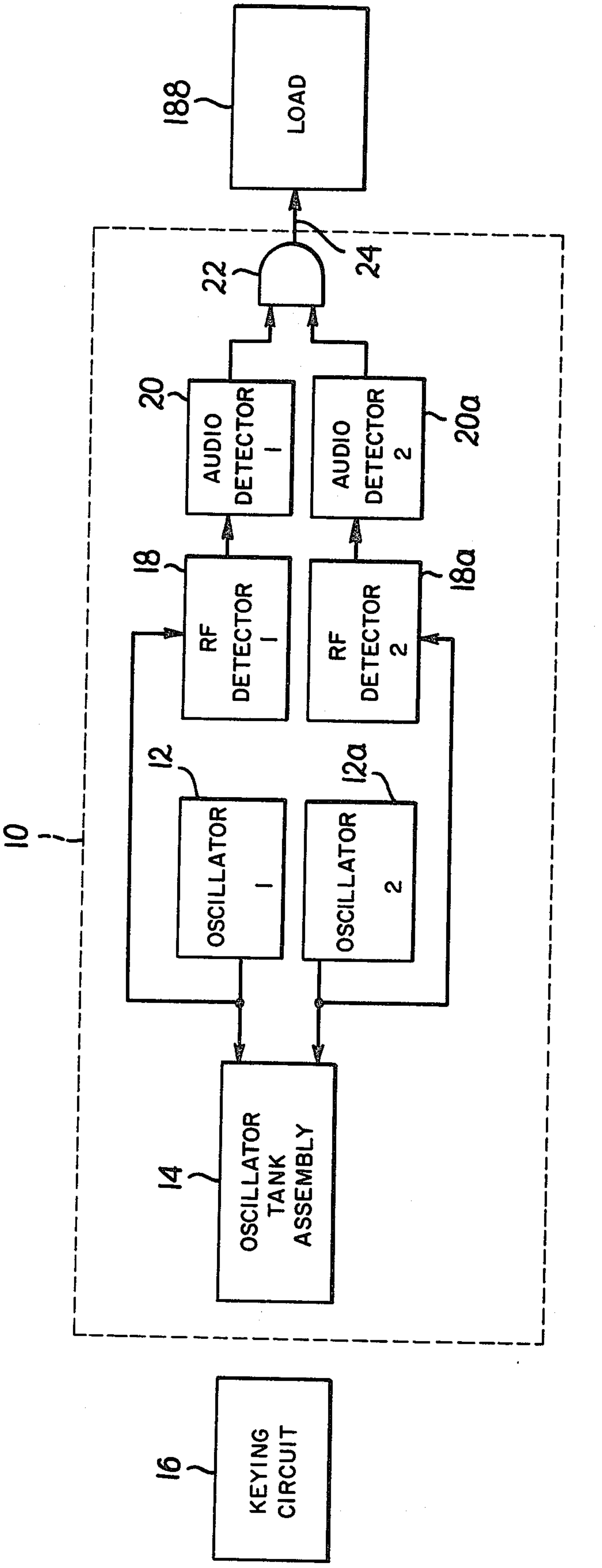
FIG. 1 shows a block diagram of the invention.

Referring now specifically to the functional block diagram in FIG. 1, the keyable control circuit 10 contains two oscillators 12, **12*a* generating different discrete cw frequencies which are connected to an oscillator tank circuit assembly 14. The oscillator tank circuit assembly 14 is positioned at a location where a keying circuit 16** may be brought into intimate proximity therewith.

The keying circuit 16 contains two resonantly tuned circuits, each of which absorbs, in a pulsating manner, the respective radio frequencies generated by the oscillators 12, **12*a*. The radio frequency energy in the oscillator tank circuit assembly 14 at the two radio frequencies varies in amplitude at the same rate at which the pulsations of absorption occur in the tuned circuits of the keying circuit 14. Two untuned radio frequency detectors 18, 18*a* connect the radio frequency envelope of the two oscillator frequencies to two audio frequency detectors 20, 20*a*. If the required amplitude modulation exists in both channels, both output lines from the two audio frequency detectors 20, 20*a* produce inputs to enable output AND gate 22. The output AND gate 22 thereupon produces an enable signal 24 to the load 188** indicating that the keying requirements have been met.

Referring now to schematic diagram of FIG. 2 wherein the functions described in connection with FIG. 1 are outlined in dashed boxes and are identified by the same reference designators, the system consists of two parallel channels which are identical except for the radio frequencies used. Only one channel will be described, consisting of tuned keying circuit 28, oscillator tank 30 in oscillator tank circuit assembly 14, oscillator 12, radio frequency detector 18, and audio frequency detector 20. The parallel channel consists of identical circuits 28*a*, 30*a*, 12*a*, 18*a* and 20*a*. The tuned keying circuit 28 comprises a resistance 32 connected across a capacitance 34, this combination being connected in series with a diode 36 which is polarized so as to have its anode connected to one terminal of inductance 38. Reversing the diode 36 polarity has no effect on circuit operation. The other terminal of inductance 38 is connected to the capacitance 34. The tuned keying circuit 28 is passive; i.e., it does not include a source of electrical power.

The two tuned circuits 28, 28*a* may be assembled in close proximity to each other and then enclosed in some article normally worn by a person authorized to use same, e.g., a ring, bracelet, watchband or the like. When so disguised, the inductance 38, 38*a* of the keying circuit 16 must be in such a position that inductive coupling with tank circuit inductances 124, 124*a* in the oscillator tank circuit assembly 14 may be effected. Similar considerations are involved in mounting the inductances 124, 124*a* in the tank circuit of the control circuit oscillators 12, 12*a*. If the disclosed circuit is employed to control access to the interior of an automobile, the tank circuit inductances 124, 124*a* also must be situated in a convenient location on the automobile's exterior and should be well disguised.

The oscillator 12 has a radio frequency output at any suitable radio frequency which may be amplitude modulated by the keying circuit 16 at an audio frequency in the range from 1 to 200 kilohertz with best results being obtained between 5 and 30 kilohertz. The oscillator 12 includes an oscillator tank 30 kilohertz. The oscillator 12 includes an oscillator parallel with the tank circuit inductance 124. A +12 volt DC power source is connected to the keyable control circuit 10 at terminal 44, with current-limiting resistance 130 and a capacitance 132 connected in series between terminal 44 and the oscillator tank 30. Preferably, the oscillator tank 30 has a high impedance so that the voltage developed across its terminals will drop precipitously when a relatively small amount of energy is absorbed from the circuit by the tuned keying circuit 28. This characteristic is achieved by deriving a signal from a relatively small portion of the total inductance of the tank circuit and by feeding that signal through capacitance 134 to the base of transistor 136, which is biased by resistance 138. The amplified output of transistor 136 is derived at the junction of its collector and load resistance 140, and is fed through capacitance 142 to the base of transistor 144, which is biased to saturation by resistances 146 and 148. The amplified output of transistor 144 is derived at the junction of its collector and resistance 130, and is fed into the oscillator tank 30 through capacitance 132, thus providing the feedback necessary to maintain normal oscillation. Transistor 144 is normally driven well into its saturation region, so that the fluctuations occurring in the output of transistor 136 in the normal operation of the control circuit will not cause any significant variations in the feedback signal which is the output of transistor 144.

The oscillator 12 is normally operative to generate a high frequency oscillatory output of substantially constant amplitude. However, when the inductance 38 of the tuned keying circuit 28 is inductively coupled to the tank circuit inductance 124 of the oscillator 12, or to a substantial portion thereof, this high-frequency oscillator output is amplitude modulated. This result is achieved by the varying ability of the tuned keying circuit 28 to absorb energy from the oscillator tank 30 of the oscillator 12. When the inductance 38 of the tuned keying circuit 28 is inductively coupled to the tank circuit inductance 124, a voltage is induced across inductance 38, thereby causing a charging current to flow through diode 36 to capacitance 34. Diode 36 is purposely selected from types which have relatively slow recovery time such as power diodes. A large diffusion capacitance (about 200 picofarads) is formed in the semiconductor material of diode 36, which capacitance is combined with fixed capacitance 34 to bring the resonant frequency of the tuned keying circuit 28 network closer to the frequency of the oscillator 12. The change in resonant frequency cause a substantial increase in the absorption of energy from the oscillator tank 30. This transfer of energy from the oscillator tank 30 to the tuned keying circuit 28 results in a drop in the voltage across the oscillator tank 30 which causes the oscillator 12 output to decrease sharply. One terminal of capacitance 34 is directly coupled to the cathode of diode 36, and as capacitance 34 becomes increasingly positively charged, the magnitude of the current flowing from anode to cathode of diode 36 is progressively diminished. Thus, the diffusion capacitance of diode 36 decreases sharply to zero shortly after a net back bias voltage is impressed across the terminals of the diode 36. This sharp delayed turn-off of diode 36 causes an equally sharp reduction in the ability of the tuned keying circuit 28 to absorb energy from oscillator tank 30 of oscillator 12. The sharpness of the turn-off of diode 36 is due to the delay in turn-off following back-biasing of the diode 36, which delay is a consequence of stored charges on opposite sides of the semi-conductor junction in the diode 36. This stored charge enables minority carriers to cross the junction even though the junction is back-biased. When the diode 36 finally reacts to the back-bias produced by the charge stored in capacitance 34, it reacts precipitously, causing a sudden disappearance of the current-controlled diffusion capacitance component of the total junction capacitance of the diode 36. The less significant voltage-controlled depletion capacitance component of the total junction capacitance of diode 36 also decreases as the voltage across capacitance 34 increases, due to the widening of the depletion layer in the semi-conductor material of the diode 36. Thus, in effect, the diode 36 acts as a DC current and voltage-controlled variable capacitance. The afore-mentioned phenomena act to suddenly detune the tuned keying circuit 28 by sharply reducing the total junction capacitance of diode 36, thus reducing the net capacitance connected across the inductance 38 and thereby reducing the resonant frequency of the tuned circuit in tuned keying circuit 28. Consequently, the ability of the tuned keying circuit 28 to absorb energy from the oscillator tank 30 is diminished. Therefore, the voltage across the oscillator tank 30 and the output voltage of the oscillator 12 rise to approximately their normal values. However, capacitance 34 now discharges through resistance 32, thereby reducing the back bias on diode 36, with the result that the junction capacitance of diode 36 is increased by the decreasing width of its depletion layer. When the net bias across the terminals of diode 36 is forward and current begins to flow from anode to cathode, the large diffusion capacitance is again suddenly formed in the semi-conductor material of diode 36. Thus, the resonant frequency of the tuned keying circuit 28 is again suddenly brought closer to the frequency of the oscillator 12, and the ability of the tuned keying circuit 28 to absorb energy from the oscillator tank 30 is sharply increased. Consequently, the voltage across the oscillator tank 30 again drops sharply, thereby causing the oscillator output to undergo a similar decrease. This continuing interaction between the tuned keying circuit 28 and the oscillator tank 30 is repeated at a low modulating frequency, i.e., low relative to the rf frequency of the output of the oscillator 12, so long as the inductive coupling between the inductance 38 of the tuned keying circuit 28 and oscillator tank circuit inductance 124 is maintained. In this fashion, an amplitude-modulated continuous wave oscillator output is produced at the collector of the first-stage amplifier transistor 136. The signal derived at this point is both the feedback loop and the oscillator 12 output signal, which is fed through capacitance 150 to the untuned radio frequency detector 18. The radio frequency, variable amplitude input signal to the radio frequency detector is detected in transistor 154. The high-frequency components are diminished by being shunted to ground through the relatively low-impedance of capacitance 160, which appears as a relatively high impedance to the low-frequency and DC components. The detected low-frequency AC plus DC component is fed through DC-blocking capacitance 172 to the base of amplifier transistor 174, which is biased and current-limited by resistances 176 and 178. The output of amplifier transistor 174 is derived at the junction of the collector of amplifier transistor 174 and resistance 178, and is fed through blocking capacitance 180 to the audio frequency detector 20 consisting of diodes 182 and 184 and capacitor 186. It will be apparent that, when the envelope of the high-frequency output of the oscillator is unmodulated, the amplifier transistor 174 will have a null output.

When modulation is present, the amplified, low-frequency AC input to the audio frequency detector 20 has its negative portion shunted to ground via diode 182, while the positive portion is passed through diode 184 to charge capacitance 186 positively. It will be readily appreciated that, by polarizing the diodes in a contrary manner, a negative output voltage will be developed across capacitance 186. The time constant for discharge of capacitor 186 by resistor 185 is long enough that, while the modulation is present, capacitor 186 remains charged at approximately the peak of the signal available at the collector of amplifier transistor 174.

The positive charge stored in capacitor 186 during the presence of the modulation enables one input of output AND gate 22. When a second tuned keying circuit **28*a* is present adjacent to the second tank circuit inductance 124*a* and also is tuned to the radio frequency of the second oscillator 12*a*, a modulation and detection process is performed identical to that just described, which produces an enable signal at the second input to output AND gate 22. If either of the required inputs to output AND gate 22 is absent, output AND gate 22 withholds its enable output to the load 188**.

Figure 3:
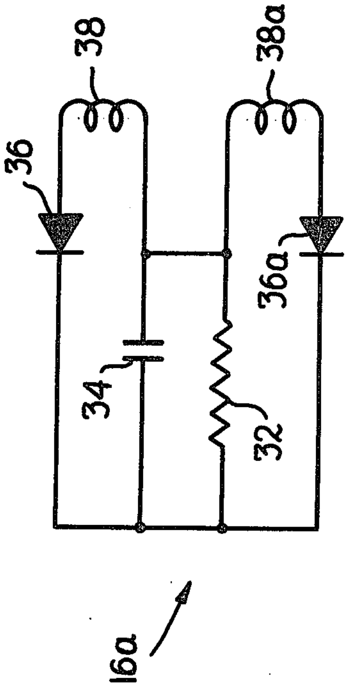
FIG. 3 shows an integrated keying circuit.

An integrated configuration of the keying circuit **16*a* is shown in FIG. 3. The coils 38, 38*a*; capacitors 34, 34*a*; diodes 36, 36*a* and resistors 32, 32*a* have been combined into an integrated assembly in which capacitor 34*a* and resistor 32*a* have been eliminated. The polarity of diodes 36 and 36*a* may both be reversed without affecting circuit operation. If the polarities are reversed, both must be reversed. The integrated assembly is designed for convenient transportation on the person of the user. To use this integrated assembly requires that both oscillator tanks 30, 30*a* be co-located such that they can both be influenced simultaneously by the keying circuit 16**.

Figure 2:
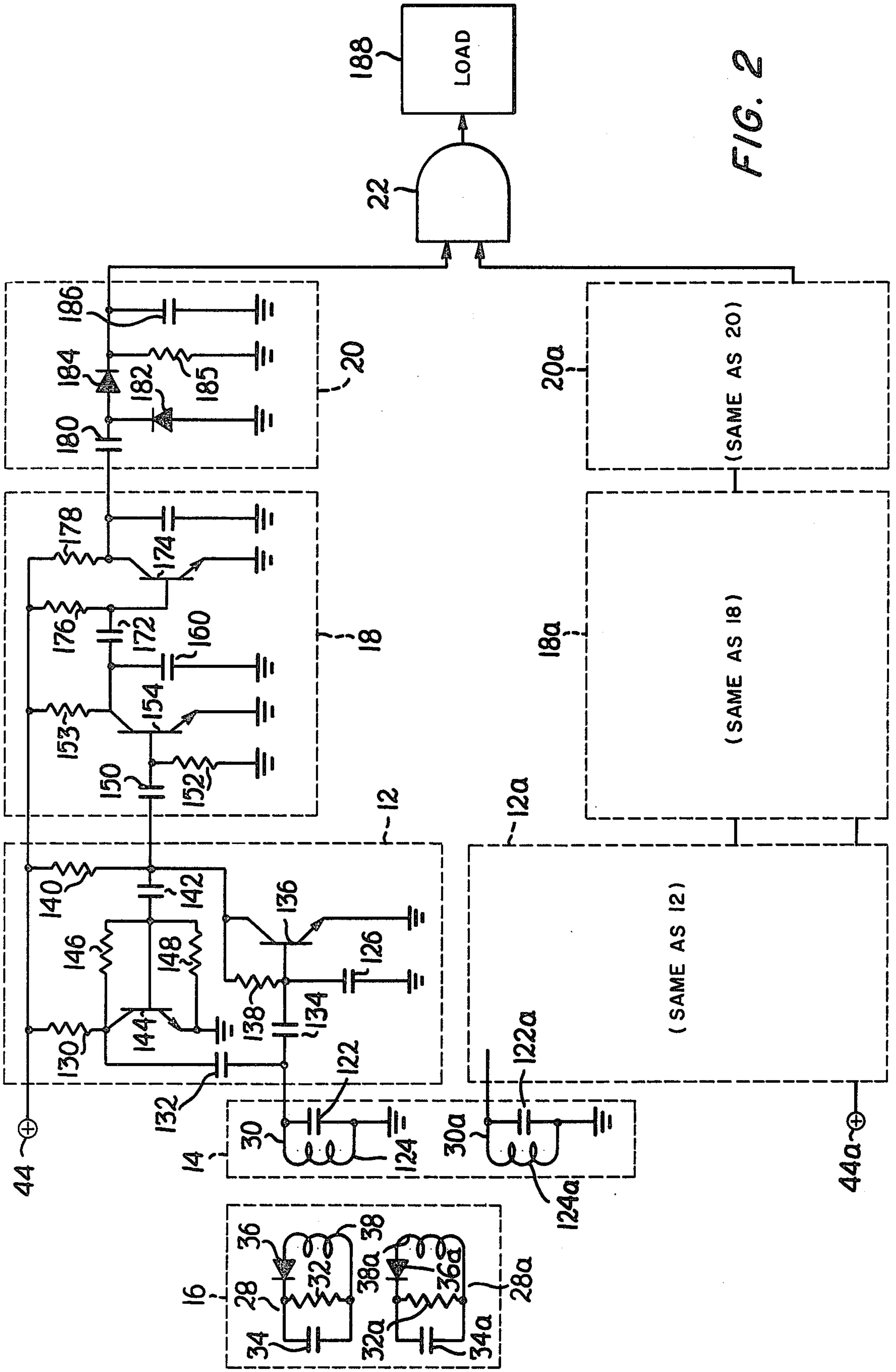
FIG. 2 contains a schematic diagram of the embodiment of FIG. 1 wherein the functions identified in FIG. 1 are defined within identically numbered boxes in FIG. 2.
Figure 4:
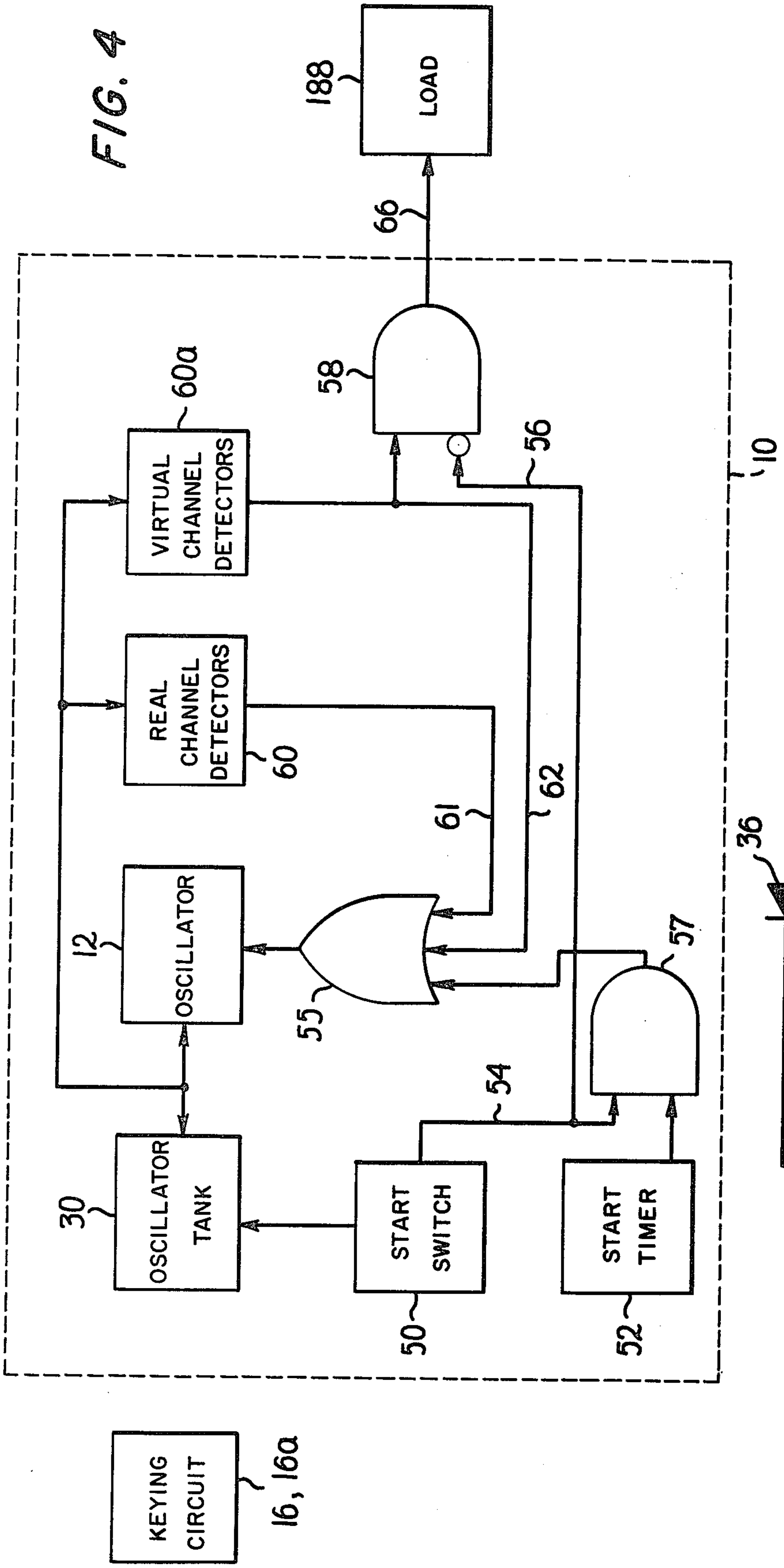
FIG. 4 shows a block diagram of a second embodiment of the invention.

The block diagram in FIG. 4 shows a dual channel system which performs the same functions as the system shown in FIGS. 1, 2 and 3 but uses a smaller number of electronic components. The reduction in components results from certain circuits performing the functions for both channels.

In the quiescent state, the oscillator 12 is turned off. To initiate operation, the keying circuit 16 or **16*a* is pressed into mechanical contact with a mechanical start switch 50. Pressing the keying circuit 16 or 16*a* into mechanical contact with the start switch 50 also functions to place the two tuned circuits within the keying circuit 16 or 16*a* into correct juxtaposition with the single oscillator tank 30. As long as the start switch 50 is depressed, it provides outputs to the oscillator tank 30, to one input of an AND gate 57, and to the inhibit input of output AND gate 58. The start switch 50 signal to the oscillator tank 30 connects an additional capacitance in parallel with the capacitance normally present across the tank coil. The signal to one input of AND gate 57 enables that input of AND gate 57. The second input to AND gate 57 is enabled for a short time by start timer 52. The output of AND gate 57 enables one input of OR gate 55. OR gate 55 provides an output which initiates operation of oscillator 12. As long as the start switch 50 is depressed, it provides an inhibit signal 56 to the inhibit input of output AND gate 58. The oscillator 12 frequency, during the time that start switch 50 remains depressed, called frequency F1, is determined by the net component values in the oscillator tank 30 including the capacitance temporarily contributed by start switch 50. Real channel detectors 60, tuned to frequency F1, function analogously to the radio frequency and audio frequency detectors previously described. Upon detection of frequency F1, the real channel detectors 60 feed back a sustaining signal 61 through the OR gate 55 to the oscillaor 12 to enable the oscillator 12 to continue operating past the timing period of timer 52. If the real channel detectors 60 fail to detect a correctly modulated signal before the end of the timing cycle of timer 52, removal of the enable signal from one input of AND gate 57 terminates the oscillation of oscillator 12** and cancels the possibility of achieving an output from the keyable control circuit.

The shortness of the time provided before terminating the operation of the oscillator 12 increases the difficulty of a tamperer in attempting to detect the operating frequency and also positively cuts off the possibility of erroneous detection by the real channel detectors 60. Start timer 52 continues to connect an inhibit signal 56 to one input of output AND gate 58 as long as the start switch 50 remains depressed.

Assuming that a properly modulated signal at frequency F1 is detected by the real channel detectors 60, and that oscillation is sustained by the sustaining signal 61 to OR gate 55 while the start switch 50 remains depressed, when the start switch 50 is released, the sustaining signal 61 fed back from the real channel detectors 60 through the OR gate 55 to the oscillator 12 is maintained for a short time. Upon release of start switch 50, the removal of the extra capacitance placed by the start switch 50 across the oscillator tank 30, causes the oscillator frequency to jump from F1 to F2. Release of the start switch 50 also removes the inhibit signal 56 previously connected to one input of output AND gate 58. The other input of output AND gate 58 remains inhibited at this instant awaiting an output from the virtual channel detectors 60a. During the short persistence of the sustaining signal 61 after the release of start switch 50, the virtual channel detectors 60a are enabled to detect a correctly modulated signal at frequency F2.

If the virtual channel detectors 60a succeed in detecting a correctly modulated signal at frequency F2, the virtual channel detectors 60a immediately provide a sustaining signal 62 through the OR gate 55 to the oscillator 12 to sustain oscillation beyond the end of the short sustaining signal 61 from the real channel detectors 60. The sustaining signal 62 from the virtual channel detectors 60a continues as long as a correctly modulated signal continues to be detected at frequency F2. The virtual channel detectors 60a also provide an enable signal to one input of output AND gate 58. Both inputs to output AND gate 58 now being enabled, output AND gate 58 provides an output enable signal 66 to the load 188.

Figure 5:
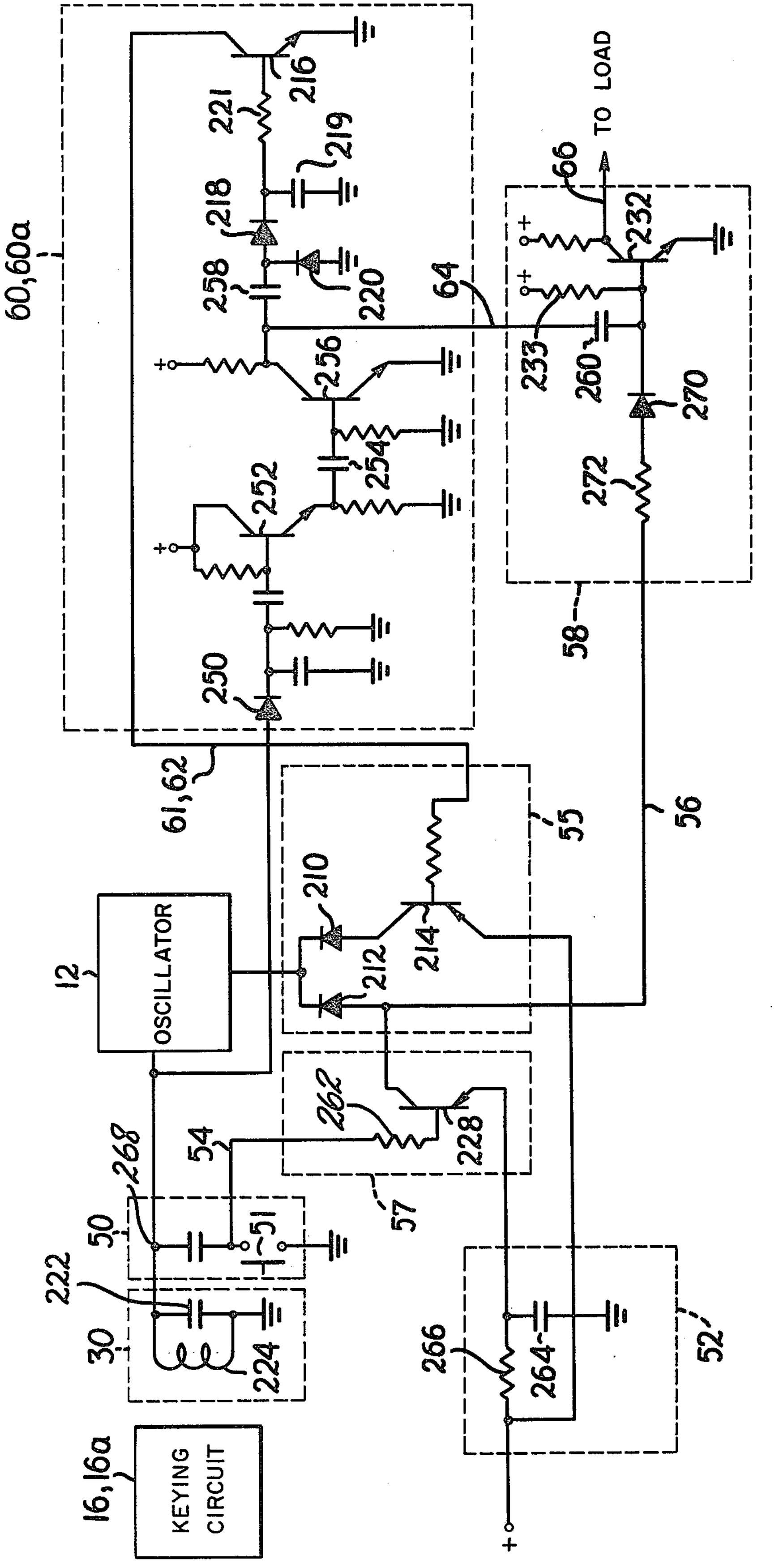
FIG. 5 is a schematic diagram of the second embodiment shown in FIG. 4. Functions identified in previous figures are identically identified in FIG. 5.

The schematic diagram, FIG. 5, shows how the circuit operates. The oscillator 12 is identical to the oscillators 12, 12a previously described. In the present circuit the oscillator 12 receives its DC power through an OR gate 55 consisting of diodes 210, 212. In the quiescent state, DC power is cut off from both gate diodes 210, 212 and from the oscillator 12. The base of transistor 228 is open as long as switch 51 is open. This cuts off the DC power source through the emitter-collector path of transistor 228 to diode 212. Similarly, the base of transistor 214 is floating due to the normally cut-off condition of transistor 216. This cuts off the DC power source through the emitter-collector junction of transistor 214 to diode 210. Consequently, oscillator 12 obtains no DC power and thus remains silent in the quiescent state. Timing capacitor 264 is charged to full supply potential through limiting resistor 266.

When mechanical switch 51 is closed to start the operation, capacitor 268 is effectively connected in parallel across tank circuit capacitor 222. Mechanical switch 51 also provides a ground return to the base of transistor 228 through resistor 262. Transistor 228 is turned on and begins supplying DC power through its base-emitter junction and diode 212 to the oscillator 12. Oscillator 12 begins oscillation at frequency F1. The resistance of limiting resistor 266 in the line to the emitter of transistor 228 is such a high value that the voltage drop across it is so great that the oscillator 12 can not operate. However, for a short time after the mechanical switch 51 is pressed, timing capacitor 264, fully charged in the quiescent state, provides sufficient voltage to allow the oscillator 12 to run. As soon as transistor 228 is turned on, it connects a positive inhibit signal 56 through diode 270 to the base of output AND gate 58 transistor 232. This positive signal 56 maintains transistor 232 in a saturated condition and thereby prevents an output enable 66 from being generated.

During the short time that timing capacitor 264 keeps the oscillator 12 operating, the real channel detectors 60 are receptive to modulation on frequency F1 induced in the oscillator tank 30. The positive peaks of the modulation applied to the radio frequency in the oscillator tank 30, as previously described, are detected by diode 250. The positive-going pulsations from diode 250 are amplified in emitter follower transistor 252 and connected through coupling capacitor 254 to detector transistor 256. Detector transistor 256 receives no base bias in the quiescent state. Consequently, detector transistor 256 is normally cut off and its collector rides at positive supply voltage. When the positive modulation pulses are applied to the base of detector transistor 256, only negative-going pulses are generated at its collector. These negative-going pulses are connected through capacitor 258 to the peak detector comprised of diodes 220 and 218 and capacitor 219. Diodes 218 and 220 are polarized to store a positive charge in capacitor 219. The resulting positive voltage at the base of transistor 216 turns on transistor 216 and thereby provides a return path to ground for the base lead of transistor 214. Transistor 214 is thus turned on and provides a positive sustaining signal 61 through its emitter-collector junction and through gate diode 210 to the oscillator 12. The voltage at the anode of gate diode 212 is limited by limiting resistor 266, whereas the voltage at the anode of gate diode 210 is not similarly limited. Consequently, the positive voltage fed through gate diode 210 to the cathode of gate diode 212 is of correct amplitude and polarity to back bias gate diode 212. This cuts off the current being fed to the oscillator 12 through transistor 228 thereby allowing timing capacitor 264 to again charge toward the supply voltage. The collector of transistor 228 continues to supply a positive inhibit signal 56 through resistor 272 and diode 270 to output AND gate transistor 232 thereby maintaining output AND gate transistor 232 in the saturated condition. Except for this inhibiting signal, output AND gate transistor 232 would be cut off by the negative pulses coupled to its base through coupling capacitor 260 from detector transistor 256. The inhibit signal 56 continues as long as the depression of mechanical switch 51 enables the continued on condition of transistor 228.

If the real channel detectors 60 fail to sense correct modulation on frequency F1 after the mechanical switch 51 is depressed, the charge stored in timing capacitor 264 is soon depleted. Limiting resistor 266 is sized such that the voltage drop across it does not provide sufficient voltage to allow the oscillator 12 to continue operation. If the parallel supply path through transistor 214 created by a detected signal is not established, the oscillator 12 is cut off when the charge in timing capacitor 264 is depleted. The voltage still available at the collector of transistor 228 continues to be sufficient to maintain output AND gate transistor 232 in the saturated condition and consequently, continue to inhibit the output as long as the mechanical switch 51 remains depressed.

If correct detection of frequency F1 is achieved with the mechanical switch 51 depressed, release of the mechanical switch 51 initiates generation of frequency F2 and the attempted detection of F2. Just before the release of the mechanical switch 51, the oscillator 12 supply voltage is sustained through the emitter-collector junction of transistor 214 because of the on condition of transistor 216 which, in turn, is maintained by the charge stored in peak-detector capacitor 219. For a short time after the start switch is released, transistor 216 is maintained in the on condition by the charge stored in the peak-detector capacitor 219. Resistor 211, in the path between peak-detector capacitor 219 and the base of transistor 216 limits the rate at which the charge in peak-detector capacitor 219 is dissipated. Also, immediately after the mechanical switch 51 is released, and until detection of the new F2 frequency begins modulation, no AC signal is available at the collector of detector transistor 256. Output AND gate transistor 232 remains saturated by the positive bias provided through bias resistor 233 even though no additional inhibit signal 56 is provided by transistor 228 which is now cut off by the opening of mechanical switch 51.

If the modulation on frequency F2 is detected before the sustaining charge on peak-detector capacitor 219 is depleted, the negative-going detected signal at the collector of detector transistor 256 is connected through capacitor 260 to the base of output AND gate transistor 232. The resistance of bias resistor 233 is so high that the negative pulses through capacitor 260 overcome the positive bias normally provided at the base of output AND gate transistor 232. Output AND gate transistor 232 is thereby cut off by the detected modulation on frequency F2. Output AND gate transistor 232 produces a positive enable signal 66 for connection to the load. The detected F2 signal at the collector of detector transistor 256 is also connected to the peak-detector diodes 218, 220 and capacitor 219. This replenishes the charge in peak-detector capacitor 219 and thereby maintains transistors 216 and 214 in the on condition. Thus, as long as modulation on frequency F2 continues to be detected, the oscillator 12 is kept running to provide a continuing signal, and the output enable signal 66 is maintained to the load.

If the modulation on frequency F2 is not detected before the sustaining charge on peak-detector capacitor 219 is depleted, through resistor 221 and the base-emitter junction of transistor 216, transistors 216 and 214 are cut off thereby depriving the oscillator 12 of its voltage supply through the emitter-collector junction of transistor 214. The oscillator 12, now deprived of a voltage supply, stops oscillation. This leaves output AND gate transistor 232 saturated. Therefore, no enable signal 66 is transmitted to the load in the absence of proper detection of frequency F2.

What is claimed is:

1. In a multiple-channel induction-keyed control circuit of the type having a plurality of passive keying network means, each of said passive keying network means including a tuned circuit having a current — and voltage — controlled variable capacitance, said variable capacitance being operative to vary the resonant frequency of its respective tuned circuit between upper and lower limits, each of said plurality of passive keying networks being resonant at a different frequency from every other of said passive keying networks, keyable circuit means operative to generate at least first and second constant output signals which, when coupled to a correctly tuned set of said passive keying networks, is operative in cooperation with said passive keying networks to generate at least first and second modulated output signals where the improvement comprises:

(a) said first constant output signal being generated without said second constant output being generated;

(b) means for generating said first modulated output signal is response to at least one of said passive keying networks coupled to said keyable circuit being tuned to said first constant output signal;

(c) means responsive to said first modulated output signal for turning on said second constant output signal;

(d) means for generating said second modulated output signal in response to at least one of said passive keying networks coupled to said keyable control circuit being tuned to said second constant output signal; and (e) keying means responsive to said second modulated output for generating a keying signal.

2. The control circuit as recited in claim 1 wherein said keyable circuit means comprises:

(a) a first oscillator operative to generate a first radio frequency;

(b) a first oscillator tank electrically cooperative with said first oscillator, the inductance of said first oscillator tank being disposed in a location where it is accessible to physical proximity with said passive keying network means;

(c) first detection means for receiving said first signal;

(d) means for generating a first signal when said passive keying network means is placed in physical proximity with said first oscillator tank;

(e) a second oscillator operative to generate a second radio frequency, said second radio frequency being different from said first radio frequency;

(f) a second oscillator tank electrically cooperative with said second oscillator, the inductance of said second oscillator tank being disposed in a location where it is accessible to physical proximity with said passive keying network means, said physical proximity being attainable at approximately the same time as physical proximity is attained between said passive keying network means and said first inductance of first oscillator tank;

(g) means for generating a second signal when said passive keying network means is placed in physical proximity with said second oscillator tank;

(h) second detection means for receiving said second signal; and (i) means for generating an output enable signal for operation of a keyed circuit upon receipt by said generating means of said first and second signals.

3. The control circuit recited in claim 2 wherein said first and second signals are required simultaneously by said output generating means.

4. The control circuit recited in claim 2 wherein said first and second outputs are required in sequence by said output generating means.

5. The control circuit recited in claim 1 wherein said keyable circuit means comprises:

(a) an oscillator operative to generate the first of said output signal initially at a first frequency;

(b) an oscillator tank electrically cooperative with said oscillator, the inductance of said oscillator being disposed in a location where it is accessible to physical proximity with said passive keying network means;

(c) means for generating a first modulated output signal when said passive keying network means containing a first correctly tuned circuit placed in physical proximity with said oscillator tank;

(d) means for shifting the frequency of said oscillator to a second frequency after the generation of said first signal;

(e) means for generating a second signal when said passive keying network means containing a second correctly tuned circuit is maintained in physical proximity with said oscillator tank; and (f) means for generating an output enable signal only after the occurrence of both of said first and second signals.

6. The control circuit recited in claim 5 wherein said oscillator is quiescent until enabled by a manual switch.

7. The control circuit of claim 6 wherein a timer cuts off said oscillator after a short period of time if said first modulated output fails to be generated with a fixed time after enablement by said manual switch.

8. The control circuit of claim 7 wherein:

(a) a timer cuts off said oscillator after a short time after shifting of said oscillator frequency to said second frequency if said second signal is not earlier generated; and (b) said output enable generating means prevents the generation of said output enable upon the occurrence of the cessation of oscillation.

* * * * *